(12) United States Patent
Agbabian et al.

(10) Patent No.: US 7,480,940 B1
(45) Date of Patent: Jan. 20, 2009

(54) STRUCTURES AND METHODS FOR A LOW AND SLOW NETWORK RECONNAISSANCE DETECTOR

(75) Inventors: Paul Agbabian, Los Angeles, CA (US); Bruce McCorkendale, Manhattan Beach, CA (US)

(73) Assignee: Symantec Corporation, Cupertino, CA (US)

( * ) Notice: Subject to any disclaimer, the term of this patent is extended or adjusted under 35 U.S.C. 154(b) by 1066 days.

(21) Appl. No.: 10/866,431

(22) Filed: Jun. 10, 2004

(51) Int. Cl.
*G08B 23/00* (2006.01)
*G06F 12/14* (2006.01)

(52) U.S. Cl. ...................................................... 726/22
(58) Field of Classification Search ................ 726/22
See application file for complete search history.

(56) References Cited

U.S. PATENT DOCUMENTS

| | | | | |
|---|---|---|---|---|
| 7,389,421 | B2* | 6/2008 | Kirovski et al. ............. | 713/176 |
| 2004/0083389 | A1* | 4/2004 | Yoshida ....................... | 713/201 |
| 2005/0235356 | A1* | 10/2005 | Wang ........................... | 726/22 |

OTHER PUBLICATIONS

Stephen Northcutt and Judy Novak, *Network Intrusion Detection, An Analyst's Handbook*, Second Edition, Chapter 7, "Mitnick Attack," New Riders, Indianapolis, Indiana, pp. 107-123 (2001).

* cited by examiner

*Primary Examiner*—Kambiz Zand
*Assistant Examiner*—Aubrey H Wyszynski
(74) *Attorney, Agent, or Firm*—Gunnison, McKay & Hodgson, L.L.P.; Forrest Gunnison

(57) ABSTRACT

Packets on a computer network are low pass filtered using a low and slow network reconnaissance detector to generate a spectrum of packets that are anomalous, i.e., are not commonly occurring IP packet traffic on the computer network. The low and slow network reconnaissance detector includes a low-frequency low-amplitude attenuation function module that adjusts an interest level for a particular network event based upon a number of occurrences. The low and slow network reconnaissance detector also includes an update detector output with system compensation function module. The system compensation function is a time dependent function that adjusts the interest level from the low-frequency low-amplitude attenuation function module to compensate for bursts of activity separated by periods of time. To facilitate the use of both modules, a non-uniformly sampled discrete network event time series for the network event is converted into a uniformly sampled network event time series.

18 Claims, 12 Drawing Sheets

STRUCTURES AND METHODS FOR A LOW AND SLOW NETWORK RECONNAISSANCE DETECTOR

BACKGROUND OF THE INVENTION

1. Field of the Invention

The present invention relates generally to computer network attacks, and more particularly to detecting low and slow probes.

2. Description of Related Art

A variety of attacks on computer networks have been documented. A source, a target, and a type characterized most attacks. Various security management systems have been developed to assist in the recognition of attacks, e.g., the identification of the type of attack. Typically, log data from firewalls and intrusion detection systems (IDSs) was stored for subsequent analysis and use.

Sometimes before the log data were stored, attempts were made to correlate events in the log data to assist in identifying an attack, the start of an attack, or anomalous events that could indicate gathering of information for a subsequent different type of attack, for example. One particular troublesome attack was referred to as a low and slow reconnaissance gathering attack or probe.

The purpose of the low and slow probe was to avoid detection by the security management systems, the intrusion detections systems and/or the firewalls. Typically, in a low and slow probe, network accesses were widely separated in time. The time periods between accesses were selected so as to be statistically insignificant to a security system based on collecting data.

Rule-based methods and search-based methods were used in correlation techniques to identify low and slow probes. Unfortunately, some correlation techniques required intensive amounts of memory for storage and analysis. These techniques were also error-prone due to the high volume of event traffic versus the long periods between accesses.

Efforts by intrusion detection system (IDS) vendors to reduce false positives have resulted in signatures that are not likely to match the sparse events associated with low and slow probes. Thus, such events are not categorized or even noticed by most IDS systems.

Finding rare occurrences of host addresses and network addresses on an intranet can be done by brute force. For example, all the log data can be collected in an indexed data store. A series of queries can be used on the indexed data store to find addresses that occur in the indexed data store within a given window, e.g., more than two times but less than 100 times.

For this approach to be successful, network addresses that do not exist must be searched for one by one. Consequently, using an indexed data store of log data is search intensive and relies on all the data being collected prior to the search. In general, this approach does not perform well and is not useful for real time display.

Also, if all packet data on a 100 MBit switched network working at 33% utilization is stored, 4.125 MB of storage per second are required. After 10 minutes, 2,475 MB are needed, or 14.85 GB per hour. Thus, saving raw packet data for subsequent analysis requires restrictive amounts of data. Detection of a low and slow attack that spans several weeks would required several weeks of raw packet data. Even with today's cheap mass storage, several weeks of raw packet data would occupy an inordinate amount of storage and would take an inordinate amount of computing power to sort through.

So called "low and slow attacks" usually actually refer to reconnaissance in preparation for attacks. Source addresses that appear intermittently over long time periods, so as to be statistically insignificant to a log analysis based security system may not be identified. One possible reason for such packets on the network is the probing for the presence of a particular service or the particular address ranges in use, in other words, network reconnaissance. For example, see the description of the Mitnick attack, in Stephen Northcutt and Judy Novak, *Network Intrusion Detection, An Analyst's Handbook*, Second Edition, Chapter 7, "Mitnick Attack," New Riders, Indianapolis, Ind., pp 107-123 (2001).

To determine whether a slow and low attack has occurred, or is occurring, it is necessary to determine the purpose of the low-frequency intrusions on the network. However, before the purpose of the low-frequency intrusions can be analyzed, the low-frequency intrusions must be reliably identified.

SUMMARY OF THE INVENTION

In one embodiment of the present invention, packets on a computer network are low pass filtered using a low and slow network reconnaissance detector to generate a spectrum of packets that are anomalous, i.e., are not commonly occurring IP packet traffic on the computer network. The particular spectrum of packets created by the low and slow network reconnaissance detector can be based upon any one of a source address, a destination address, a source port and a destination port, or any other information in the packet that may be useful in identifying a packet as anomalous. In embodiments that are not performed using a real-time data stream, or in embodiments that utilize time, e.g., a time interval, a timestamp for the packet may be used along with the information in the packet used in identifying the packet as anomalous.

The low and slow network reconnaissance detector includes a low-frequency low-amplitude attenuation function module that adjusts an interest level for a particular network event, e.g., a network event having a particular characteristic, based upon a number of occurrences. In one embodiment, the number of occurrences is an actual number of occurrences. In another embodiment, the number of occurrences is the number of time intervals in which one or more network events occur.

In one embodiment, the low and slow network reconnaissance detector also includes an update detector output with system compensation function module. The system compensation function is a time dependent function that adjusts the interest level from the low-frequency low-amplitude attenuation function module to compensate for bursts of activity separated by periods of time.

To facilitate the use of both modules, in one embodiment, a non-uniformly sampled discrete network event time series for the network event is converted into a uniformly sampled network event time series. A frequency characteristic for the network event is determined based upon the uniformly sampled network event time series.

BRIEF DESCRIPTION OF THE DRAWINGS

In the drawings and the following detailed description, elements with the same reference numeral are the same or equivalent elements. Also, the first digit of the reference numeral is the figure number in which the corresponding element first appears.

DETAILED DESCRIPTION

Figure 1:
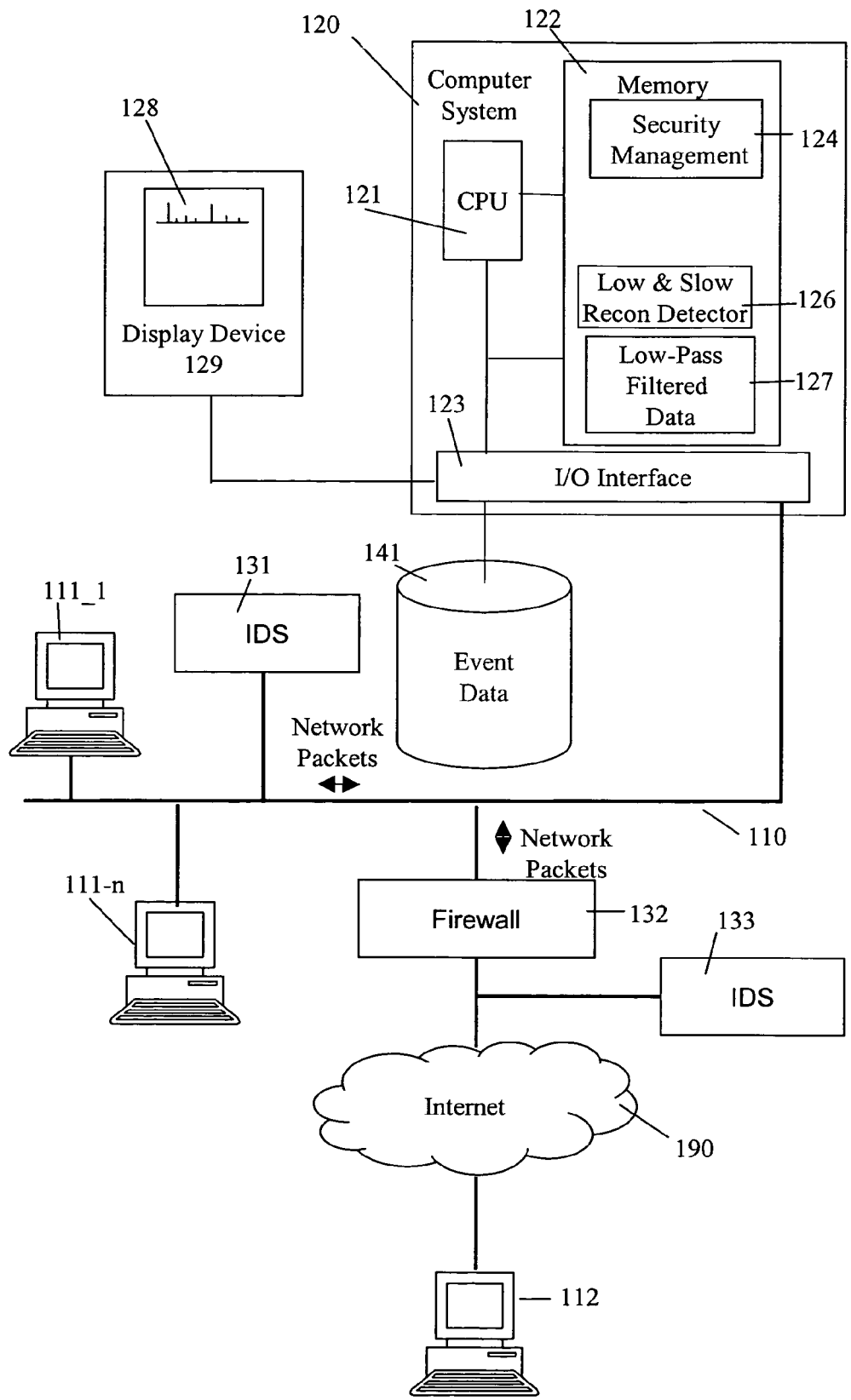
FIG. 1 is an illustration of a computer network that includes at least one computer system that includes an embodiment of the low and slow incident detector according to one embodiment of the present invention.

In one embodiment of the present invention, packets on a network 110 are low pass filtered using a low and slow network reconnaissance detector 126 to generate a spectrum of packets that are anomalous, i.e., are not commonly occurring IP packet traffic on network 110. The particular spectrum of packets created by low and slow network reconnaissance detector 126 can be based upon any one of a source address, a destination address, a source port and a destination port, or any other information in the packet that may be useful in identifying a packet as anomalous. In embodiments that are not performed using a real-time data stream, or in embodiments that utilize time, e.g., a time interval, a timestamp for the packet may be used along with the information in the packet used in identifying the packet as anomalous.

Low and slow network reconnaissance detector 126 quickly and efficiently identifies packets that occur infrequently in a stream of network traffic. Information from the identified packets can be used as search keys by a security management system 124 when querying security events in an event database 141 or other data store of security management system 124. In particular, an associative correlation from the information to events or alerts reported by an intrusion-detection system 131, 133 provides early warning that a low-amplitude or surveillance probe may be occurring.

In one embodiment, output from low and slow network reconnaissance detector 126, i.e., data from low pass filtered data 127, is presented as a graphical display 128 on a display device 129. The peaks in graphical display 128 represent the anomalous packets on network 110. The peaks represent interest levels of sets of IP packets.

While there is no causal relationship from information in low-pass filtered data 127 to actual attacks, information in low-pass filtered data 127 provides a simple highly efficient tool for a security analyst to use in near real time to identify signals in the noise of security management system 124. In some environments, low-frequency packets with foreign addresses generally may be suspicious, and display of these addresses on display device 129 as a watch list may be useful to the security analyst.

In the following example, network 110 and low and slow network reconnaissance detector 126 are described as using the Internet Protocol (IP). However, this is illustrative only and is not intended to limit the invention to IP packets. Also, low and slow network reconnaissance detector 126 is illustrated on the same computer system 120 as security management system 124 for convenience only. An instance of low and slow network reconnaissance detector 126 can be located on any, all, or any desired combination of hosts on network 110. However, detector 126 also can be independent of any host so that detector 126 can see packet data at the same tier as a firewall or network intrusion detection device.

Figure 2A:
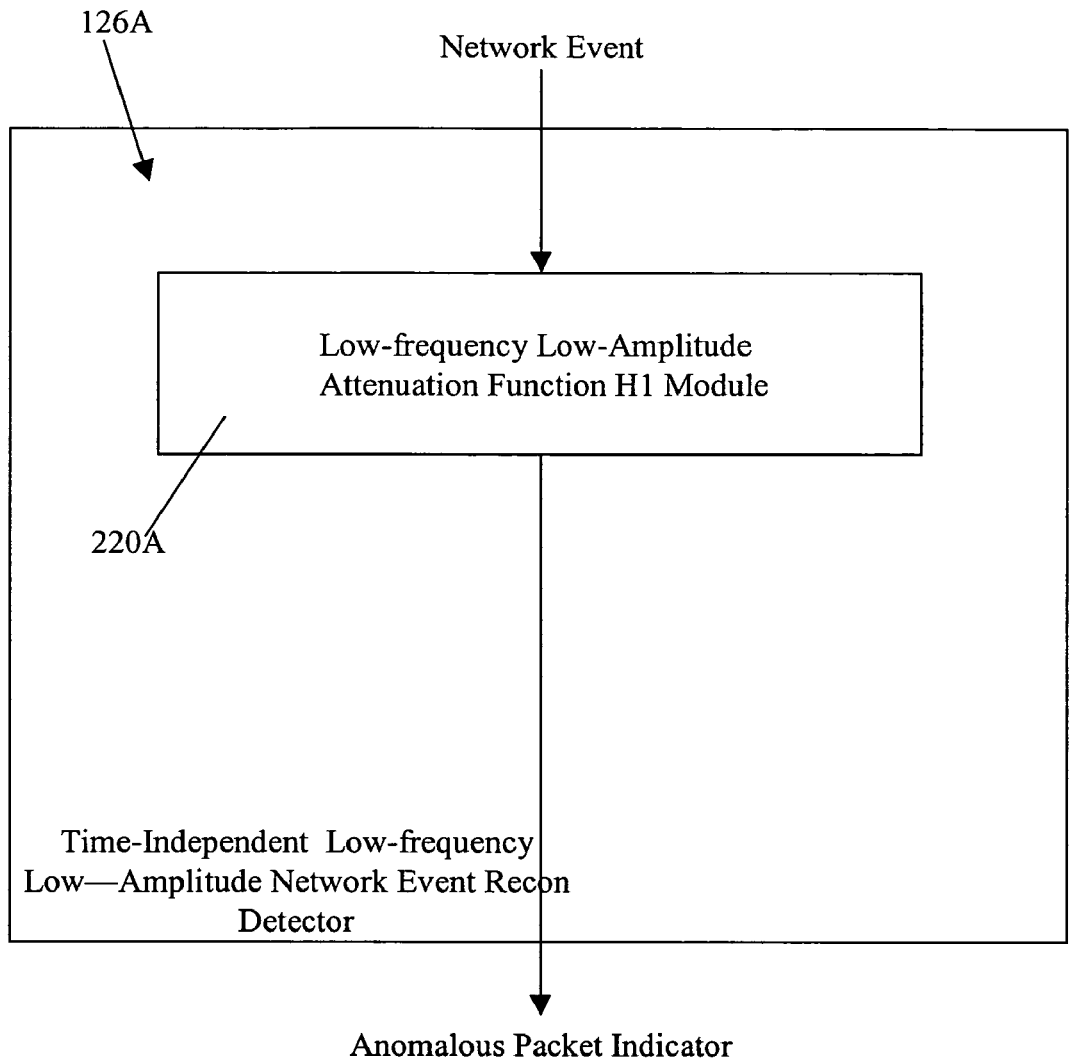
FIG. 2A is one embodiment of the low and slow incident detector that is a time-independent low-frequency low-amplitude network event reconnaissance detector including a low-frequency low-amplitude attenuation function H1 module.

In the embodiment of FIG. 2A, low and slow network reconnaissance detector 126A is a time independent low-frequency low-amplitude network reconnaissance detector. Low and slow network reconnaissance detector 126A detects low and slow network reconnaissance by tracking (i) source IP address IPj and (ii) occurrences of that source IP address. Low and slow network reconnaissance detector 126A uses an interest level M(IPj) to indicate the occurrences of a particular source address IPj, i.e., the occurrences of a network event having a particular characteristic.

Interest level M(IPj) is attenuated based on the previous cumulative occurrence of source IP address IPj. Thus, the interest level for frequent traffic is at or near zero, while the interest level for infrequent traffic is closer to the initial value of interest level M(IPj), e.g., one.

In the embodiment of FIG. 2A, low-frequency low-amplitude attenuation function H1 module 220A initially sets interest level M(IPj) to one on the first occurrence of a given source IP address IPj. On subsequent incidences of the same source IP address IPj, interest level M(IPj) is attenuated using an attenuation function H1. Several possible attenuation functions can be used depending on how quickly interest level M(IPj) should be decreased with repeated occurrences.

As explained more completely below, low-frequency low-amplitude attenuation function H1 module 220A lends itself to an inexpensive implementation because a very small amount of data and processing is necessary for each network event and because data is only kept for source IP addresses, i.e., network events with a specific characteristic, which are seen. At any given time, the source IP addresses with an interest level above some threshold are easily determined. These source IP addresses make good search keys for further analysis within the framework of a more traditional IDS or security operations center.

In the embodiment of FIG. 2A, low-frequency low-amplitude attenuation function H1 module 220A is useful for detecting low and slow probes such that the number of occurrences does not attenuate interest level M(IPj) below a critical value. Ideally, this critical value and the attenuation function are selected so the number of occurrences required to attenuate interest level M(IPj) below the critical value is such that normal security apparatuses and/or processes detect the intrusion, for example.

While useful, this embodiment does not take time into consideration. Using only low-frequency low-amplitude attenuation function H1 module 220A, if module 220A is allowed to run long enough without re-initialization, an attacker that initially stands out within timeframe T (e.g. 1 month), but who repeatedly returns every timeframe T eventually ends up with an attenuated interest level that is below the interest level threshold after N intervals (where N is dependent on the attenuation function).

To provide a more robust low and slow network reconnaissance detector 126, a time-dependent low and slow network reconnaissance detector 126B (FIG. 2B) is utilized. Low and slow network reconnaissance detector 126B detects low and slow network reconnaissance by tracking (i) source IP address IPj and (ii) occurrence per time unit of that source IP address.

As explained more completely below, in one example of this embodiment, the time unit is a uniform bucket width and each bucket is considered to have an occurrence if one or more instances of source IP address IPj occur in the bucket, and otherwise is considered not to have an occurrence. Low and slow network reconnaissance detector 126B also uses an interest level M(IPj) to indicate the occurrence per time unit of a particular source IP address IPj.

Interest level M(IPj) is first attenuated based on the previous cumulative occurrence per time unit of source IP address IPj and then adjusted for the time dependence of the occurrences. Thus, the interest level for frequent traffic is at or near zero, while the interest level for infrequent traffic is closer to the initial value of interest level M(IPj).

Figure 2B:
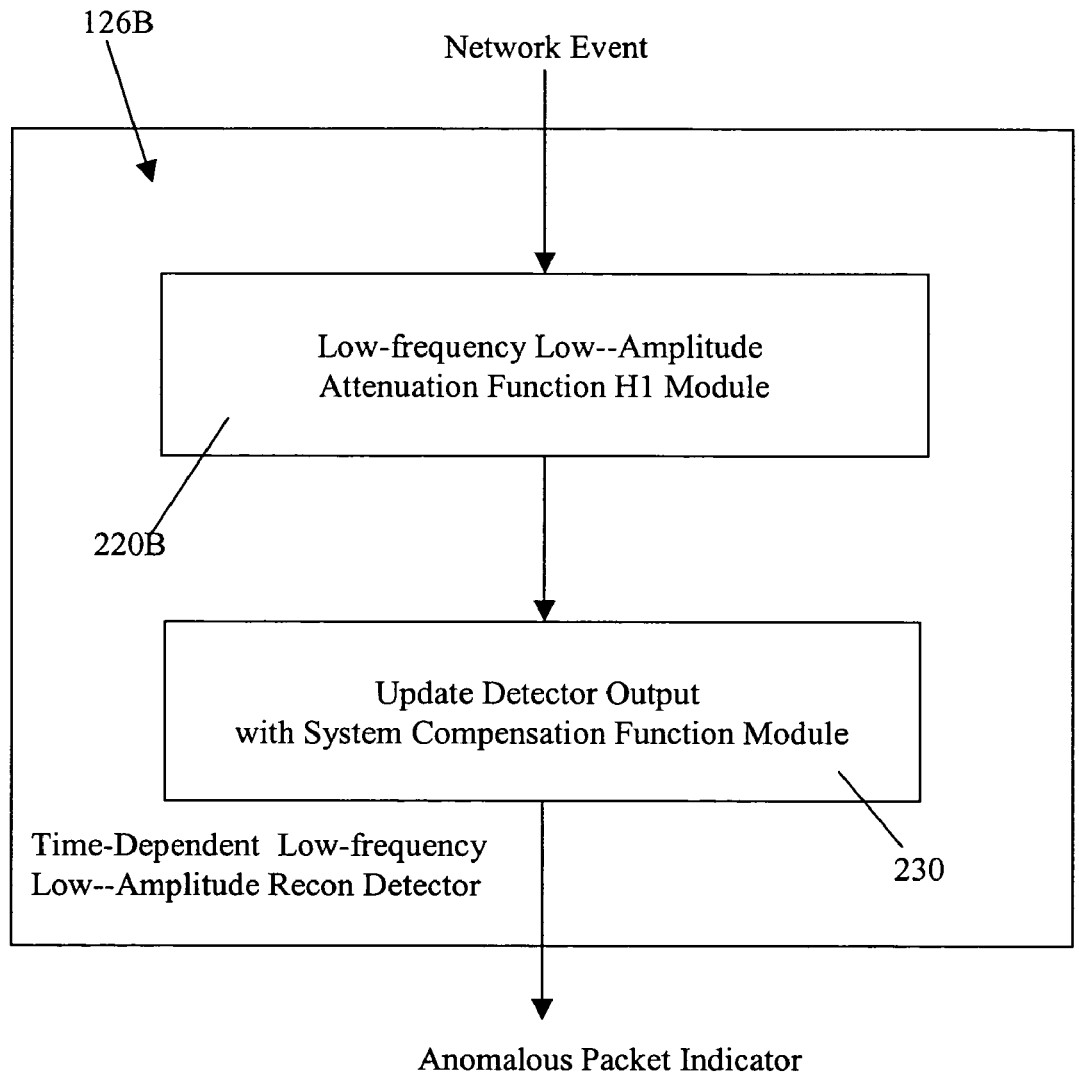
FIG. 2B is another embodiment of the low and slow incident detector that is a time-dependent low-frequency low-amplitude network event reconnaissance detector including a low-frequency low-amplitude attenuation function H1 module and an update detector output with system compensation function H2 module.

In the embodiment of FIG. 2B, low-frequency low-amplitude attenuation function H1 module 220B initially sets interest level M(IPj) to one on the first occurrence of a given source IP address IPj. On (i) a subsequent occurrence or occurrences of source IP address IPj within a unit of time, interest level M(IPj) is attenuated by module 220B. In this embodiment, multiple occurrences of source IP address IPj with a single unit of time are considered as a single occurrence. Several possible attenuation functions can be used depending on how quickly the interest should be decreased with repeated occurrences.

As explained more completely below, low-frequency low-amplitude attenuation function H1 module 220B also lends itself to an inexpensive implementation because a very small amount of data and processing is necessary for each network event and because data is only kept for source IP addresses that are seen. The operation of module 220B is equivalent to the operation of module 220A.

In the embodiment of FIG. 2B, an update detector output with system compensation function H2 module 230 is used in combination with low-frequency low-amplitude attenuation function H1 module 220B. This combination takes time into consideration.

Update detector output with system compensation function H2 module 230 introduces a compensating function to account for the slow periodic-like probe. A novel way to map sparse network events into a moving average frequency domain representation is used by update detector output with system compensation function H2 module 230.

A new system compensation function H2 that is sensitive to when events occur in time as well as how many events occur over all observed time is introduced. This method can distinguish bursts of many events spaced far apart in time from the same number of events spaced closely in time.

The method has the added advantage of smoothing the number of events in a time interval regardless of what type of protocol carries the network packets. A uniformly sampled time series of macro events, from buckets of microevents, is created. In fact, attenuation function H1 used in module 220A also benefits from this bucket approach to smoothing the input to the attenuation function.

As explained more completely below, the macro events are processed to estimate a moving average of frequency content that represents the spacing in time of the macro events. Frequency sensitive system compensation function H2 processes the output of low-frequency low-amplitude attenuation function H1 module 220B and compensates for attenuations that occur when macro events are spaced far apart in time. Thus, interest level M(IPj) remains closer to the initial valued when burst of occurrences of events with source IP address IPj are separated far apart in time.

A secondary indicator is the rate of change of the magnitude of interest level M(IPj) that indicates when a surveillance probe accelerates into an attack. Although the interest level magnitude itself may diminish, the secondary indicator increases dramatically only when the primary indicator, interest level M(IPj), formerly had a significant value.

Figure 3:
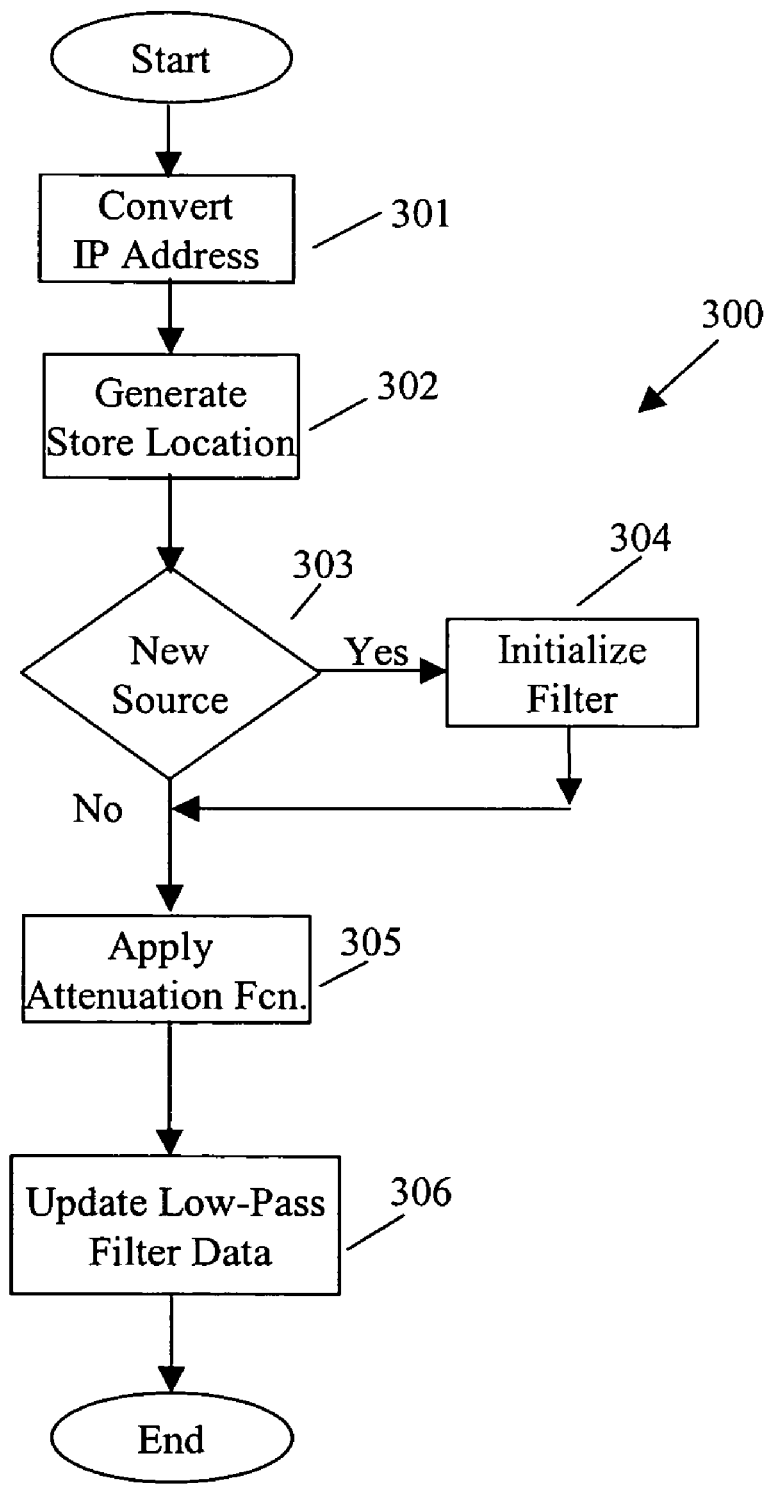
FIG. 3 is a process flow diagram for the low-frequency low-amplitude attenuation function H1 module of FIG. 2A according to one embodiment of the present invention.

FIG. 3 is a process flow diagram for one embodiment of low-frequency low-amplitude attenuation function H1 module 220A(FIG. 2A). Prior to considering convert IP address operation 301, the classes of IP addresses for one example are briefly considered.

As is known to those of skill in the art, the IP protocol defines several classes of addresses. As an example, an IPv4 address is 32 bits in size and is typically represented using dotted-decimal notation. Each class has a range of addresses. TABLE 1 defines the range for each of Classes A, B, and C.

| Class | Range |
| --- | --- |
| A | 0.0.0.0 to 127.255.255.255 |
| B | 128.0.0.0 to 191.255.255.255 |
| C | 192.0.0.0 to 223.255.255.255 |

Each Class A address includes a network id field that is 7 bits in size, and a host id field that is 24 bits in size. Each Class B address includes a network id field that is 14 bits in size, and a host id field that is 16 bits in size. Each Class C address includes a network id field that is 21 bits in size, and a host id field that is 8 bits in size. The use of an IPv4 address is illustrative only and is not intended to limit the invention to this particular address scheme. In general, the various embodiments of this invention can be utilized with any addressing scheme of interest.

In the following embodiments, a source IP address IPj representing source computer system 112 is used in low and slow packet identification processes, e.g., process 300 (FIG. 3), e.g., system 112 is the source of a low and slow probe. Convert IP address operation 301 changes the source IP address to a base-ten numerical value.

The conversion of a source IP address to a numerical value is well known to those of skill in the art. Nevertheless, for a dotted decimal source IP address of 198.19.92.100, the binary representation of the source IP address is 11000110 00001010 01011100 1100100, which is converted to an integer numerical value of 3,322,567,780. In this embodiment, the source IP address, which is typically in a binary form in the packet, is converted to a base ten integer that in turn is converted to a real number, which is akin to a floating point number. This is done because a wider variety of attenuation functions can be used in low and slow network reconnaissance detector 126 and it allows fractional changes from the original integer to be determined. Hence, in this embodiment, a stream of source addresses that are real numbers represents the stream of packets on network 110.

In another embodiment of operation 301, the network ID of the source IP address is used to generate a network ID real number, and the host ID of the source IP address is used to generate a host ID real number. These real numbers are used as described below.

Upon completion of convert IP address operation 301, processing transfers from operation 301 to generate store location operation 302.

Generate store location operation 302 can be implemented in a number of ways. In one embodiment, the integer number representing the source IP address is a key to a hash function that in turn generates an address for a storage location in low-pass filtered data 127.

In another embodiment, the network ID integer number is used to generate an offset to a zero-based indexed array and the host ID real number is used to generate an index to a storage location in the zero-based indexed array in low-pass filtered data 127. Alternatively, set-ordered hashes could be used.

Upon completion of generate store location operation 302, new source check operation 303 accesses the storage location generated in operation 302. If there is a valid record at the storage location, check operation 303 transfers to apply attenuation function operation 305 and otherwise to initialize filter operation 304.

In initialize filter operation 304, the key corresponding to the hash, i.e., the source IP address IPj in this embodiment, is written to low-pass filter data 127 along with an initial value of interest level M(IPj) for low and slow network reconnaissance detector 126. Upon completion, operation 304 transfers to operation END. In another embodiment, upon completion, operation 304 transfers to apply attenuation function operation 305.

The initial value of interest level M(IPj) is dependent upon the type of filter used. The initial value represents an initial amplitude associated with source IP address IPj. In spectrum 128, the amplitude of interest level M(IPj) is the displacement of the spectral line from the baseline. If knowledge is known about source IP addresses of a low and slow probe 112, the initial value may be different from the initial value for other source IP addresses.

In this embodiment, the amplitude of interest level M(IPj) decreases with receipt of each subsequent packet associated with source IP address IPj. Thus, a larger initial amplitude maintains the spectral line longer in the spectrum than a smaller initial amplitude. In one embodiment, the initial amplitude is set to one for all IP source addresses.

When check operation 303 transfers processing to apply attenuation function operation 305, low and slow network reconnaissance detector 126 retrieves the amplitude from low-pass filtered data 127 at the storage location generated in operation 302. Low and slow network reconnaissance detector attenuates the amplitude of interest level M(IPj), in operation 305, using attenuation function H1. The attenuated value of interest level M(IPj) is stored in data 127 for source IP address IPj in update low-pass filter data operation 306.

In one embodiment, low and slow network reconnaissance detector 126 uses an attenuation function H1, such as:

$$M\_i = M\_(i-1) * 0.95$$

where $M\_(i-1)$ is the interest level for a source IP address after the (i-1) intrusion; and $M\_i$ is the output amplitude for the source IP address of the low and slow network reconnaissance detector after the i-th intrusion.

Table 1 is an illustration of the stored amplitudes for this attenuation function after a particular number of intrusions. Each intrusion reduces the amplitude by five percent.

TABLE 1

| Number of Intrusions | Amplitude |
|---|---|
| 1 | 1.000 |
| 2 | 0.950 |
| 3 | 0.903 |
| 4 | 0.857 |
| 5 | 0.815 |
| 6 | 0.774 |
| 7 | 0.735 |
| 8 | 0.698 |
| 9 | 0.663 |
| 10 | 0.630 |
| 11 | 0.599 |
| 12 | 0.569 |
| 13 | 0.540 |
| 14 | 0.513 |
| 15 | 0.488 |
| . | . |
| . | . |
| 28 | 0.250 |

In selecting an attenuation function H1, particular protocols may require different attenuation functions. Factors considered in selecting an attenuation function include the ability of the attenuation function to differentiate the network traffic based on known statistical properties of the network protocol being used and the traffic characteristic associated with that network protocol.

Figure 4A:
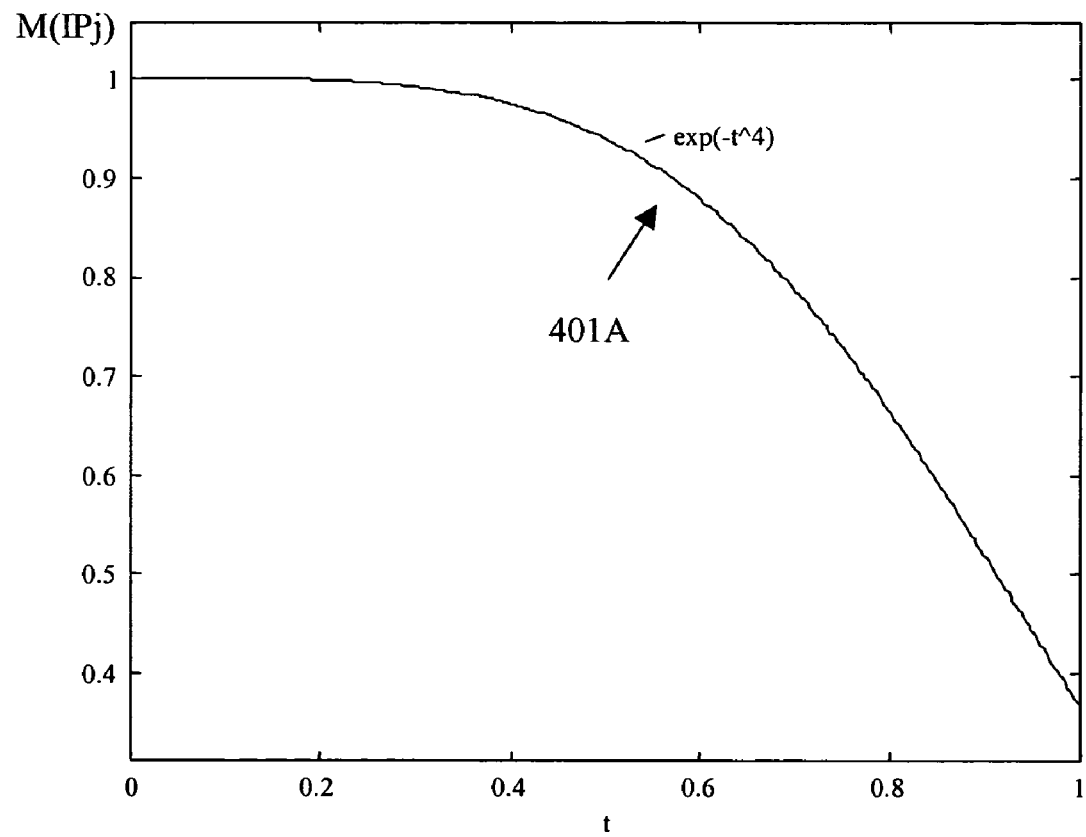
FIGS. 4A to 4C are examples of different embodiments of attenuation function H1 according to different embodiments of the present invention.

Another example of an attenuation function H1 that can be applied to successive occurrences of an IP address (packet) is illustrated in FIG. 4A. In this example, curve 401A is generated using $$M\_i = M\_(i-1) * e^{}(-(t^{}4))$$

where, for example, t=n/n_max n is the number of occurrences; and n_max is a number of occurrences such that the normal security management feature detects the number of packets, e.g., the reconnaissance and/or attack is no loner stealthy.

Figure 4B:
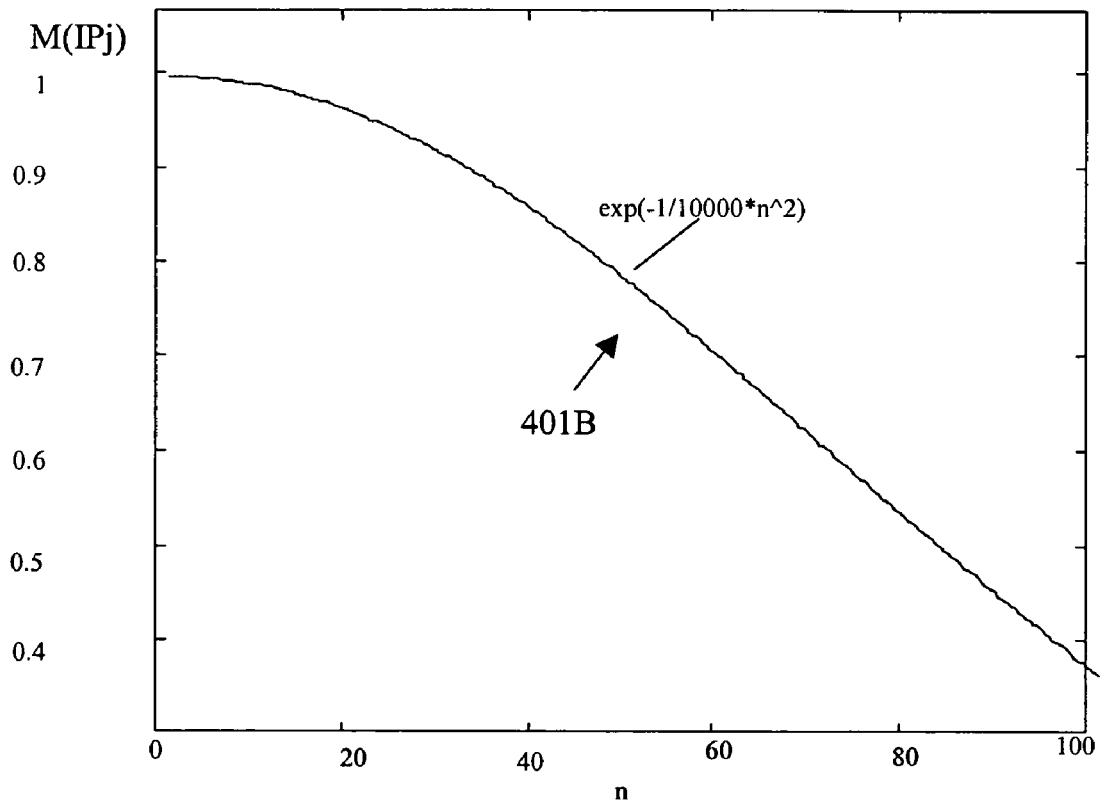

FIG. 4B is an example of an attenuation function H1 that is adjusted so that the 100$^{th}$ occurrence of n has the same value as t equal to one in FIG. 4A, e.g., curve 401B is generated using $$M\_i = M\_(i-1) * e^{}(-(1/10000)(n^{}2)).$$

Figure 4C:
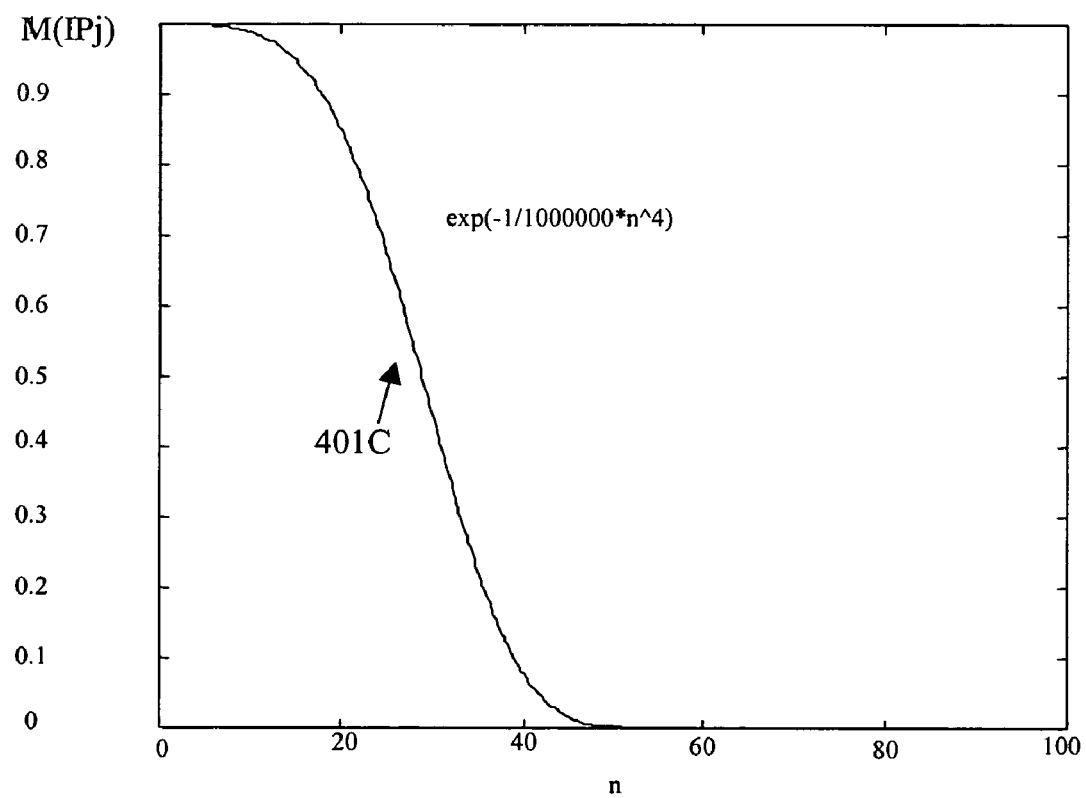

FIG. 4C is an example of an attenuation function H1 that is tuned for a sharper roll-off, e.g., curve 401C is generated using $$M\_i = M\_(i-1) * e^{}(-(1/1000000)(n^{}4))$$

As explained above, in one embodiment, the output of low-frequency low-amplitude attenuation function H1 module 220A can be displayed and/or used for analysis. If a hash function is used to generate the address for storage in low-pass filtered data 127, the data is sorted so that the addresses are in numerical order before a spectrum is generated for display. Also, a threshold may be applied so that only source IP addresses with amplitudes greater than the threshold are displayed in the spectrum.

Similarly, a threshold can be used to select source IP addresses that in turn are used as keys for queries to an event database 141. Low and slow network reconnaissance detector 126A identifies the source IP addresses that are likely associated with a low and slow probe. However, as noted above, the correlation between the source IP address and an attack is determined by use of the source IP address as a key in search for more detailed information about the intrusion(s) associated with the source IP address in event data 141.

The above attenuation functions based on event count are useful at filtering out frequent visitors on the network. However, in another embodiment (See FIG. 2B.), interest level M(IPj) is a function of time as well as event count to account for event bursts that are spaced far apart in time. The total count of events might still be relatively high, for example as a natural characteristic of certain protocols such as HTTP.

In this embodiment, network traffic is approximated as a uniformly sampled time series with real valued amplitudes. The resultant time series is a signal that is input to a finite impulse response (FIR) or infinite impulse response (IIR) digital filter that is tuned for long periods and attenuates the network traffic amplitudes (real values based on a Dirac delta function) such that only infrequent traffic is passed through the digital filter.

In this embodiment, a single-input/single-output linear system, e.g., low and slow network reconnaissance detector 126B, is modeled in discrete time with a constant sampling interval such that the highest frequency represented is at most one-half the sampling interval (this is referred to as the Nyquist frequency as defined by Shannon's sampling theorem).

Frequencies that exceed the Nyquist frequency are subject to aliasing errors, which introduce smearing and distortion at the output of the linear system. To avoid aliasing errors, the input signal is passed through an anti-aliasing low-pass filter, which reduces energy in the signal significantly at frequencies above the Nyquist frequency, which minimizes the aliasing errors at the output of the discrete linear system, often characterized as a filter.

Two problems associated with network packet traffic can be solved by:
 a) creating a uniformly sampled time series, and
 b) guaranteeing that the frequency of the sampled data does not exceed some maximum frequency, such that the time series data may be passed through a discrete linear system, either for the purpose of filtering the signal, or to transform the time series data into the frequency domain using a Fourier transform.

Since network traffic events are by nature random, the network traffic events have no natural sampling interval. The maximum sampling frequency for such events is related to the network speed in number of bits per second, since each packet is a countably finite number of bits. However, packet size varies, even within a TCP session.

A parameterized characteristic of a packet stream can be based on the packet's IP source address, target address, source port, target port, etc. Typically, the source IP address is used for techniques such as low-slow detection.

A series of packets with the same source IP address constitutes a non-uniformly sampled time series where the smallest sampling interval may approach the network bit-speed. To turn this non-uniformly sampled time series into the uniformly sampled time series, a suitable time interval is chosen. Above, the time interval was referred to as a unit of time.

All network events associated with a given source IP address (or other parameter, such as port number) for this time interval are considered as one occurrence or one bucket of packets. For example, if the source IP address occurs twice in this time interval, the bucket has a single occurrence. Thus, each bucket either has an occurrence, or does not have an occurrence.

Figure 5:
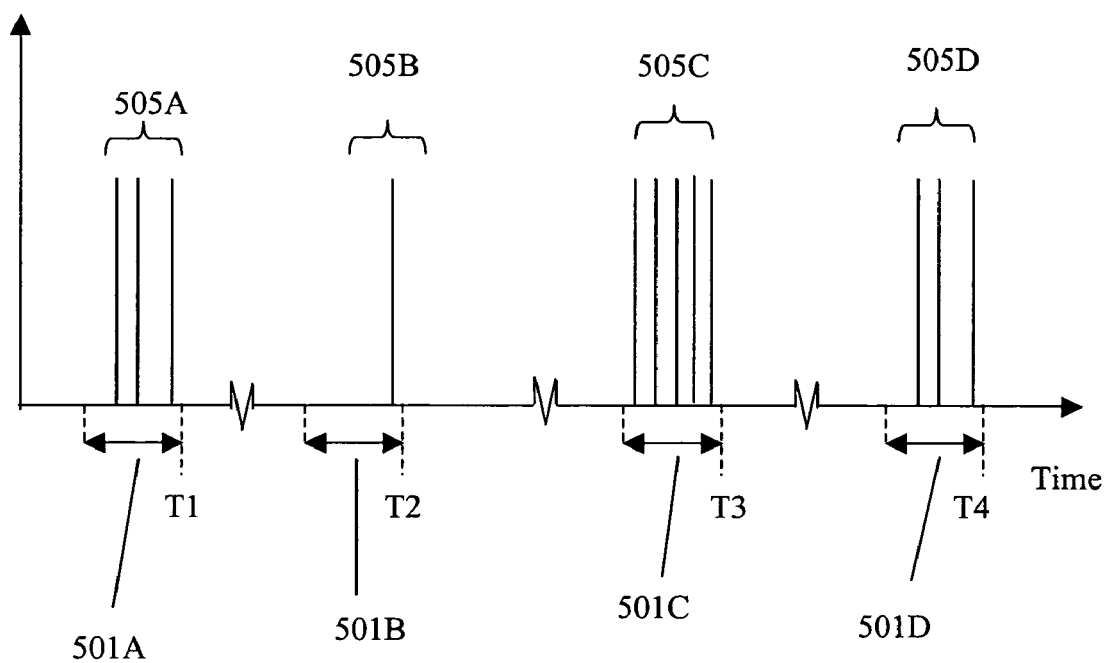
FIG. 5 is an illustration of one embodiment used to convert a non-uniformly sampled discrete network event time series for a network event into a uniformly sampled network event time series.

For example, four bursts of activity 505A to 505D (FIG. 5) occur over a time span from time T1 to time T4 for a particular source IP address IPj. Each burst is widely separated in time from the previous burst. Each of the four bursts is contained in one of buckets 501A to 501D, respectively. Each bucket is for a uniform time interval, i.e., each bucket has a constant uniform width.

Bucket 501A at time T1 has three occurrences of source IP address IPj. Thus, bucket 501A has an occurrence. The buckets after time T1 but before time T2 do not have an occurrence.

A single occurrence of source IP address IPj is in bucket 501B at time T2. Thus, bucket 501B has an occurrence. The buckets after time T2 but before time T3 do not have an occurrence.

Five occurrences of source IP address IPj are in bucket 501C at time T3. Thus, bucket 501C has an occurrence. The buckets after time T3 but before time T4 do not have an occurrence. Three occurrences of source IP address IPj are in bucket 501D at time T3. Thus, bucket 501D has an occurrence The time interval, e.g., the bucket size, is chosen such that the inverse of the time interval is more than twice the maximum frequency passed through the linear system. For the low-slow application the time interval is much smaller than $1/f\_h$ where $f\_h$ is the maximum frequency.

A packet with a given IP address, sometimes called a network event, is detected and considered a micro sample that is put into a bucket. This solves the problem of an inherently non-uniformly sampled discrete time series because each bucket's time instance is considered a sample occurrence.

Figure 6:
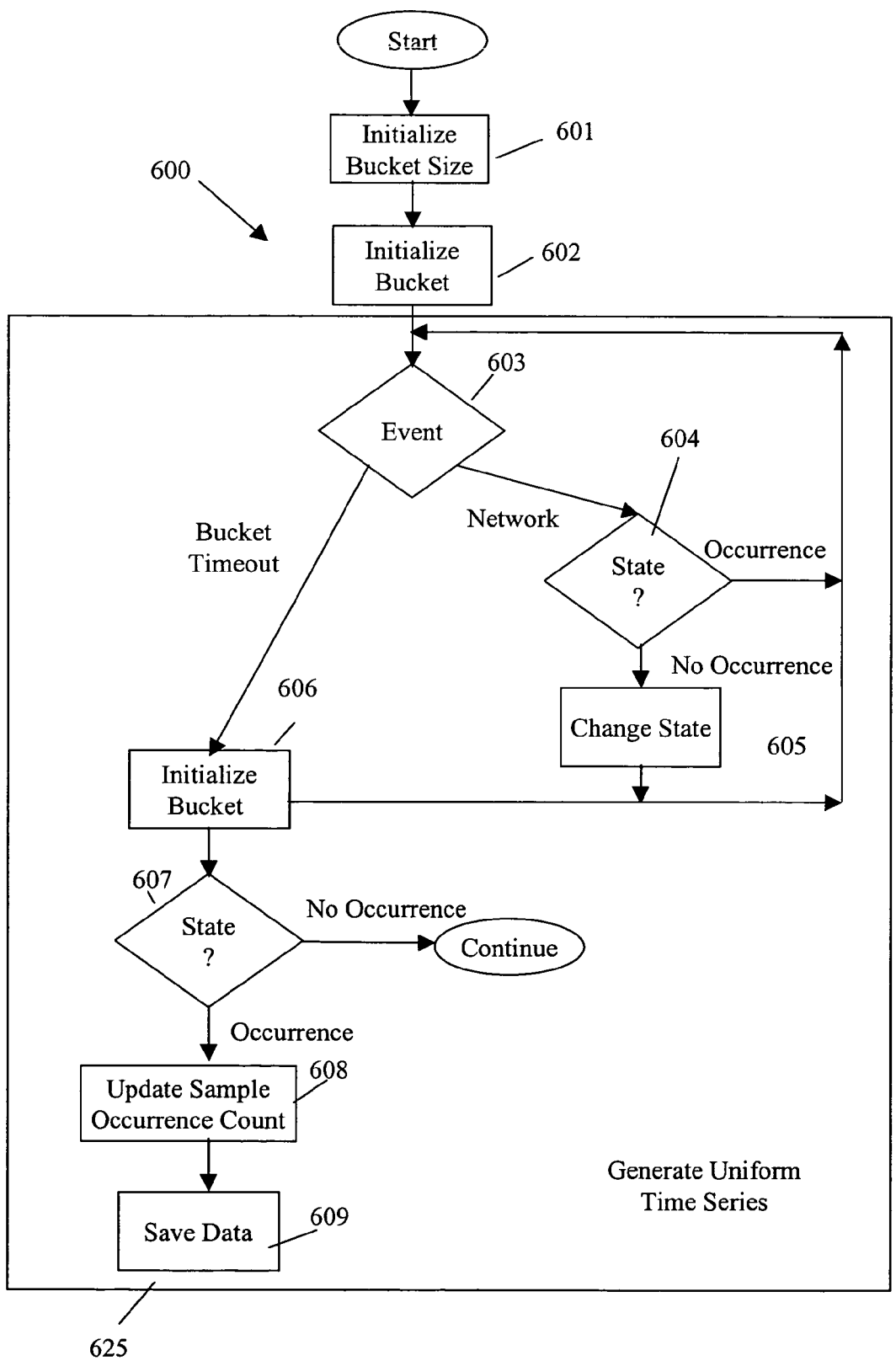
FIG. 6 is a process flow diagram for converting a non-uniformly sampled discrete network event time series for a network event into a uniformly sampled network event time series according to one embodiment of the present invention.

FIG. 6 is a process flow diagram for one embodiment of a method 600 for converting an inherently non-uniformly sampled discrete network event time series into a uniformly sampled network event time series, as described above. In initialize bucket size operation 601, a bucket size is defined for the uniformly sampled discrete time series. The bucket size is chosen such that the inverse of the time interval is more than twice the maximum frequency passed through the network event filter, e.g., low and slow network reconnaissance detector 126B. Operation 601 transfers to initialize bucket operation 602.

In initialize bucket operation 602, a bucket is set to one of a first predefined state and a second predefined state, e.g., one of no occurrence and occurrence. In this example, the bucket is set to an occurrence, which, in this example, is the second predefined state. The predefined state selected depends, for example, upon how the method is launched. In this example, it is assumed that a first occurrence of a source IP address IPj was detected and so method 600 was started. Thus, the occurrence of the source IP address is considered to happen within the first bucket and so the bucket's state is set to occurrence. A timer for the bucket size is also initialized. After the bucket is initialized in operation 602, processing waits for an event to occur in event check operation 603.

In this example, two events are of interest, a bucket timeout, which means the sampling period for the active bucket has ended, and a network event such as an occurrence of a packet having a source IP address IPj associated with the active bucket.

In this example, only a single bucket is being considered. However, in practice, there is a bucket for each source IP address being monitored in one embodiment.

Upon occurrence of a network event, event check operation 603 transfers processing to state check operation 604. If the state of the active bucket is "Occurrence," a previous network event has occurred within the active bucket and so the state of the active bucket indicates that fact. Thus, state check operation 604 transfers processing to event check operation 605. Conversely, if the state of the active bucket is "No Occurrence," the network event is the first to occur in the bucket and state check operation 604 transfers processing to change state operation 605.

In change state operation 605, the state of active bucket is changed to "Occurrence," since a network event has occurred in the bucket. Upon completion, change state operation 605 returns processing to event check operation 603.

Upon occurrence of a bucket timeout event, event check operation 603 transfers processing to initialize bucket operation 606. In initialize bucket operation 606, a bucket timer for a new active bucket is initialized and the new active bucket is set to the first predefined state, e.g., "No Occurrence". Upon completion, operation 606 transfers processing to state check operation 607 that in turn transfers processing to event check operation 603.

State check operation 606 determines the state of the bucket that was active. In this example, if the bucket has the first predefined state, e.g., "No occurrence," no information about the bucket is subsequently used and so processing simply continues. Conversely, if the bucket has the second predefined state, "Occurrence," processing transfers to update sample occurrence count operation 608.

Update sample occurrence count operation 608 is optional. If a count of the number of buckets with state "Occurrence" is needed for subsequent processing, operation 608 is used. Update sample occurrence count operation 608 increments a count of the number of buckets with state "Occurrence" and transfers processing to save data operation 609.

In one embodiment, save data operation 609 is optional. Whether save data operation 609 is needed and the data saved by operation 609 are dependent upon how the uniform time series data generated by operation 625 is subsequently used. In this example of operation 609, the number of buckets with state "Occurrence" and the time of the bucket are saved for further processing.

There is no inherent amplitude value associated with each sample occurrence. However, there is a valid notion of frequency content in the signal based on the uniform sampling interval (the bucket width). Bursts of activity separated by periods of time T can be tracked by a running average frequency favg.

Assume that each occurrence of the address (smoothed within a bucket interval) constitutes a sinusoid of amplitude 1.0 and a frequency f, meaning that it is occurring periodically at 1/f. On the first occurrence, frequency f is 0.0 and a steady state component (equivalent to direct current or DC) is added in theory. However, on the next occurrence, a non-DC component is added to the synthesized signal, with a frequency f determined based on the difference in time between the two occurrences. By superposition of sinusoids, a time series can be created that includes the varying periodicity of occurrences of the source IP address IPj. Each subsequent sinusoid has a phase offset based on its time offset from the first occurrence (considered to be time t0 for the time history. This approach essentially creates a Fourier series to generate the time function, where each Fourier coefficient is 1.0 and the phase varies, as noted above.

Although this approach approximates a uniformly sampled time series for input to a digital filter, a simpler approach to filtering the signal is to store the superposed signal in the frequency domain by adding components at lines on the frequency axis for the magnitude of the spectrum corresponding to the sinusoidal components, and phase values at those frequencies on the phase portion of the spectrum. When frequencies in excess of some cutoff frequency become prevalent, the signal begins to look like a high frequency signal. Although more and more high frequency components are added to the spectrum, the low-frequency components always remain, hence the signal still passes energy through a low pass filter.

A simpler approach that consumes very little memory (no time series or spectrum needs to be maintained) builds on the notion of the superposition of frequency components based on an assumed periodicity determined by the difference in time of the last two occurrences. This is the concept of an average frequency of occurrence.

Average frequency favg is favg=0 for n=1 favg=$(1/(T\_2-T\_1)+1/(T\_3-T\_2)+1/(T\_4-T\_3)++1/(T\_n-T\_(n-1))/n$ for $n>1$ If the numerator of average frequency favg is stored separately from the denominator, a moving average frequency favg can be computed over time. Also, n is not defined to be the individual occurrence of the address on the network, but the number of uniform sample intervals that include at least one or more of the individual occurrences. This is a form of instantaneous sampling, where the time interval, referred to as the bucket or bucket width above, smears all individual samples within the time interval (similar to a sample and hold device).

When using average frequency favg, the time series is only created conceptually by addition of components into the frequency domain. However, a true time series can always be created by performing an inverse Fourier transform.

Figure 7A:
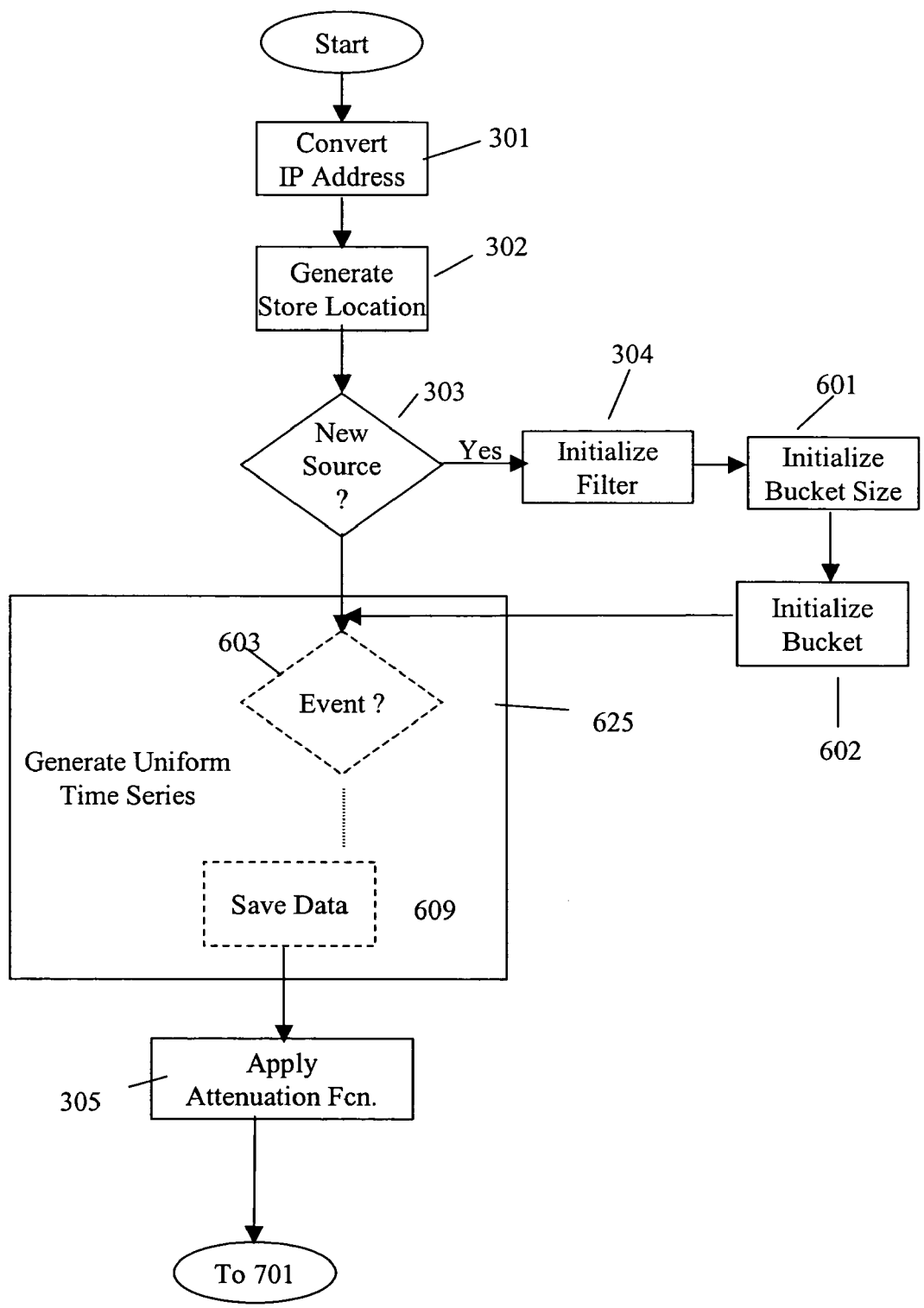
FIGS. 7A and 7B are a process flow diagram for the time-dependent low-frequency low-amplitude network reconnaissance detector of FIG. 2B according to one embodiment of the present invention.
Figure 7B:
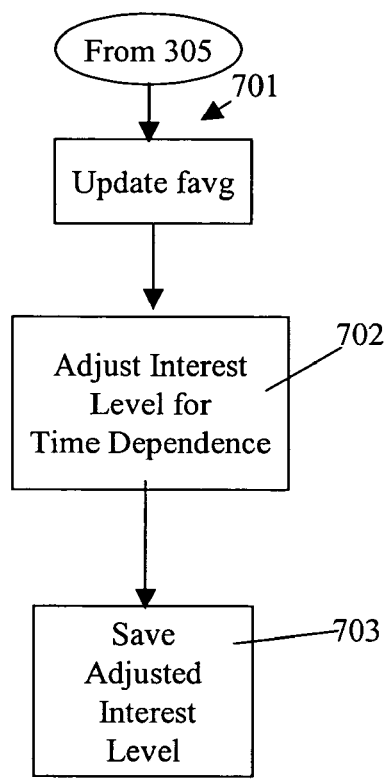

FIGS. 7A and 7B are a process flow diagram for one embodiment of a time-dependent low and slow network reconnaissance detector 126B. Operations 301 and 302 are equivalent to those described above and that description of operations 301 and 302 is incorporated herein by reference.

New source check operation 303 transfers to initialize filter operation 304 if this is the first occurrence of network event A, e.g., the first occurrence of source IP address IPj, and otherwise transfers to event check operation 603 in generate uniform time series operation 625.

Initialize filter operation 304 is equivalent to that described above and that description is incorporated herein by reference. However, in this embodiment, initialize filter operation 304 transfers to initialize bucket size operation 601.

Operations 601, 602 and 625 (FIG. 7A) are equivalent to the operations described for the elements with the same reference numerals in FIG. 6 and that description is incorporated herein by reference. Upon completion of operation 609 within operation 625 processing transfers to apply attenuation function operation 305.

Recall that operation 609 was reached, in this embodiment, when network event A occurred. Thus, apply attenuation function operation 305 applies, as described above, a non-time dependent attenuation function H1 to interest level M(A). Attenuation function H1 continually decreases the magnitude of interest level M(A). For the nth occurrence of event A on the network, interest level M(A) is represented as interest level M(An) In this embodiment, apply attenuation function operation 305 transfers processing to update average frequency operation 701 (FIG. 7B).

Update average frequency operation 701 determines a new average frequency based upon the definition provided above.

Specifically, in this example, operation 701 uses the new data stored in operation 609 along with the numerator from the prior execution of operation 701 to determine the new value of average frequency favg.

Figure 8:
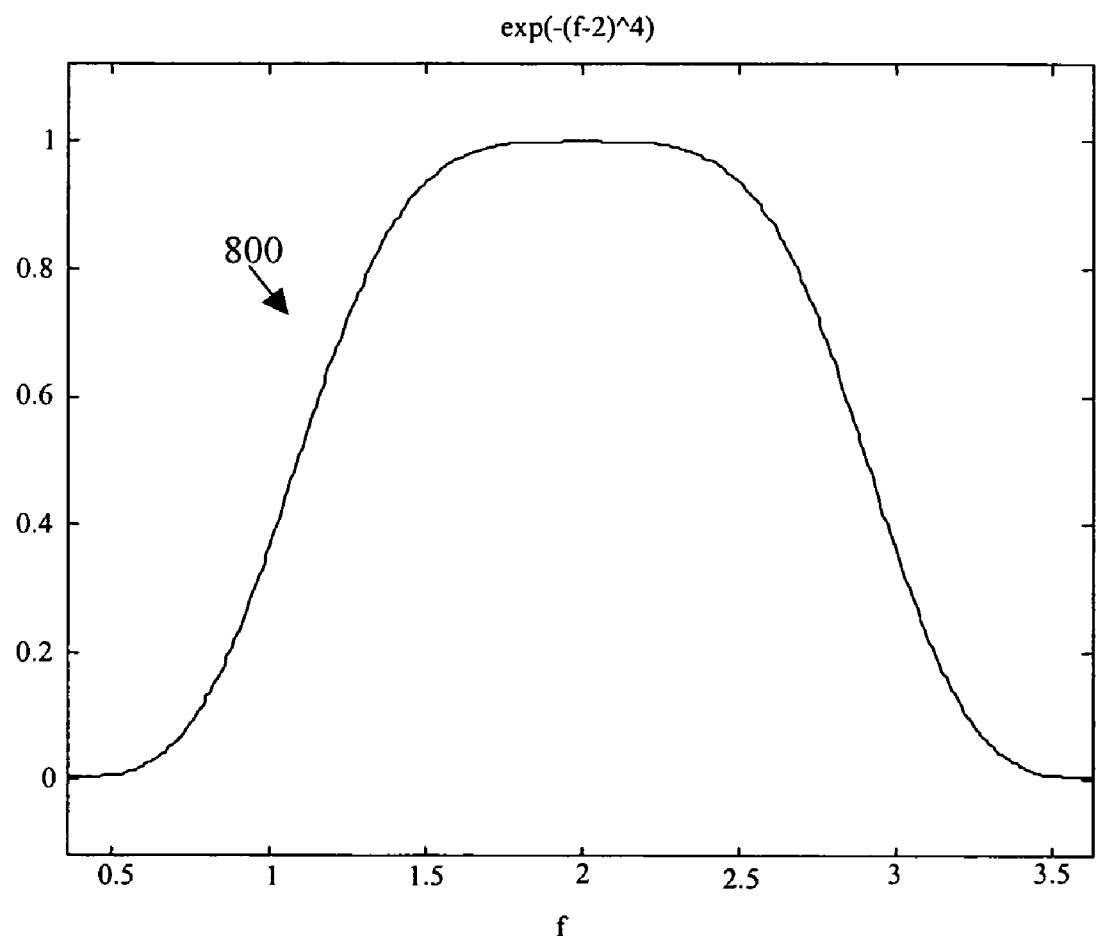
FIG. 8 is an example of a system compensation function H2 according to one embodiment of the present invention.

Upon completion, operation 701 transfers processing to adjust interest level for time dependence operation 702. Using system compensation function H2 in operation 702, the magnitude of interest level M(An) is readjusted based on recurrence, when average frequency favg is less than some maximum compensation frequency fcomp. For example, assume that maximum compensation frequency fcomp is set to 4 occurrences per week. FIG. 8 is an example of a curve 800 that represents one embodiment of system compensation function H2. For frequencies of 0 to 2 occurrences per week, the compensation increases, and for frequencies from 2 to 4 occurrences per week, the compensation decreases. For frequencies greater than 4 occurrences per week, there is no compensation. One factor used in selecting a system compensation function H2 is the full width at half maximum of the curve representing the system compensation function.

For the first occurrence of event A, n is one and average frequency favg is zero. The amplitude added, in operation 702, to output M(A1) of operation 305 is zero. Subsequently, when operation 701 generates an average frequency favg of two occurrences per week after n occurrences, a maximum adjustment 1.0 based upon curve 800 is added to output M(An) of operation 305 compensating for the attenuation introduced by attenuation function H1 after n occurrences.

Note that over many weeks, n continues to increase, and eventually the output of operation 305 approaches zero. However, due to the regularity and relative infrequency of the visits, system compensation function H2 corrects for the attenuation, and the interest level M(An) continues to have a value somewhere around 1.0. Hence, low and slow probe 112 cannot use widely spaced in time packets (See FIG. 5) to defeat low and slow network reconnaissance detector 126B.

An additional indicator can be computed that is of interest. Movement of average frequency favg from low to high constitutes a possible movement into attack mode. This is a first derivative of average frequency favg of occurrence in time, since the signal is inherently nonstationary (that is, its statistics and harmonic content can vary with time).

A tag on the address when suspicion is aroused can allow further tracking on an address that would otherwise be removed from view. A more elegant indicator is the first derivative of the interest level M with respect to time. A running first derivative is computed based on the difference of interest level M over the most recent time interval between occurrences of a bucket. This new indicator is a measure of transition from surveillance to attack. However, another value must be computed and stored at each occurrence.

Those of skill in the art will understand that when it is said that an application, a module or an operation takes some action, the action is the result of executing one or more instructions by a processor, or alternatively the action is the result of automated hardware. While embodiments in accordance with the present invention have been described for a computer system 120, an embodiment of the present invention may be carried out using any suitable hardware configuration involving a personal computer, a workstation, a portable device, or any other device found on a network. The network configuration is not essential to this invention and can be a client-server configuration, a peer-to-peer, a web-based, an intranet, or the Internet or combinations of these configurations.

As used herein, a computer memory refers to a volatile memory, a non-volatile memory, or a combination of the two.

Herein, a computer program product comprises a medium configured to store computer readable code for any one, all or any combination of the methods and structures described herein. The computer readable code could be for all or any part of the various embodiments of low and slow network reconnaissance detector 126. Some examples of computer program products are CD-ROM discs, DVDs, ROM cards, floppy discs, magnetic tapes, computer hard drives, and servers on a network.

The medium may belong to the computer system itself. However, the medium also may be removed from the computer system. This could be accomplished in a client-server system, or alternatively via a connection to another computer via modems.

In one embodiment, a computer-program product comprises a computer-readable medium containing computer program code for a method including:
converting a non-uniformly sampled discrete network event time series for a network event into a uniformly sampled network event time series; and
determining a frequency characteristic for said network event based upon said uniformly sampled network event time series.

In another embodiment, a computer-program product comprises a computer-readable medium containing computer program code for a method including:
processing computer network events using an attenuation function to generate an indicator of a number of occurrences of a network event having a particular characteristic and
identifying said network event as a low-amplitude low-frequency network event when said indicator has a specified relationship with a threshold.

In yet another embodiment, a computer-program product comprises a computer-readable medium containing computer program code for a method including:
processing computer network events using an attenuation function to generate an indicator of a number of occurrences wherein an occurrence is when one or more network events having a particular characteristic occur in a time interval;
processing said indicator using a system compensation function to generate a time-dependent indicator; and
identifying said network event as a low-amplitude low-frequency network event when said time-dependent indicator has a specified relationship with a threshold.

In general, a computer program product may include all, some, one of computer program code for the embodiments of the methods disclosed herein. In other embodiments, part of the computer program code for an embodiment of a method may be included in one computer program product and another part of the computer program code included in another computer program product.

As illustrated in FIG. 1, this medium may belong to computer system 120 itself. However, the medium also may be removed from computer system 120. For example, low and slow detector 126 may be stored in a memory 122 that is physically located in a location different from processor 121. Processor 121 should be coupled to the memory 122. This could be accomplished in a client-server system, or alternatively via a connection to another computer via modems and analog lines, or digital interfaces and a digital carrier line.

More specifically, in one embodiment, host computer system 120 is a portable computer, a workstation, a two-way pager, a cellular telephone, a digital wireless telephone, a personal digital assistant, a server computer, an Internet appliance, a firewall, an intrusion detection system, or any other device that includes components that can execute the low and slow network reconnaissance detector functionality in accordance with at least one of the embodiments as described herein. Similarly, in another embodiment, the system executing the low and slow network reconnaissance detector is comprised of multiple different computers, wireless devices, cellular telephones, digital telephones, two-way pagers, or personal digital assistants, server computers, or any desired combination of these devices that are interconnected to perform the methods as described herein.

In another embodiment, load balancing techniques are employed to balance the processing across multiple low and slow network reconnaissance detectors as those of skill in the art will understand in light of this disclosure.

In view of this disclosure, the low and slow network reconnaissance detector in accordance with one embodiment of present invention can be implemented in a wide variety of computer system configurations. In addition, the low and slow network reconnaissance detector functionality could be stored as different modules in memories of different devices. For example, the low and slow network reconnaissance detector 126 could initially be stored in a server system, and then as necessary, a portion of low and slow network reconnaissance detector 126 could be transferred to another system and executed on that system. In view of this disclosure, those of skill in the art can implement various embodiments of the present invention in a wide-variety of physical hardware configurations using an operating system and computer programming language of interest to the user.

In yet another embodiment, low and slow network reconnaissance detector 126 is stored in a memory of a server system. Low and slow network reconnaissance detector 126 is transferred, over a network to a memory in another system, e.g., memory 122 in host computer system 120. In this embodiment, I/O interface 123 would include analog modems, digital modems, or a network interface card.

Also, the various computer systems, networks, computer program code, storage devices, memory structures etc taken together in appropriate combinations are means for achieving the functionality described herein. For example, in one embodiment, a structure includes:

means for converting a non-uniformly sampled discrete network event time series for a network event into a uniformly sampled network event time series; and means for determining a frequency characteristic for said network event based upon said uniformly sampled network event time series.

In another embodiment, a structure includes:

means for processing computer network events using an attenuation function to generate an indicator of a number of occurrences of a network event having a particular characteristic and means for identifying said network event as a low-amplitude low-frequency network event when said indicator has a specified relationship with a threshold.

In still yet another embodiment, a structure includes:

means for processing computer network events using an attenuation function to generate an indicator of a number of occurrences wherein an occurrence is when one or more network events having a particular characteristic occur in a time interval;

means for processing said indicator using a system compensation function to generate a time-dependent indicator; and means for identifying said network event as a low-amplitude low-frequency network event when said time-dependent indicator has a specified relationship with a threshold.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

We claim:

1. A method for characterizing events on a network comprising:

converting a non-uniformly sampled discrete network intrusion event time series for a network intrusion event into a uniformly sampled network intrusion event time series, wherein said converting comprises:
  specifying a bucket for use in obtaining said uniformly sampled network intrusion event time series;
  detecting said network intrusion event; and
  counting all occurrences of said network intrusion event in said bucket as a single occurrence for said bucket so that said bucket has a state of one of occurrence and no occurrence; and determining a frequency characteristic for said network intrusion event based upon said uniformly sampled network intrusion event time series wherein said frequency characteristic is an average frequency of said network intrusion event.

2. The method of claim 1 where said specifying further comprises:

specifying a size for said bucket wherein said size is a time interval.

3. The method of claim 2 further comprising:

selecting said time interval so that an inverse of said time interval is more than twice the maximum frequency of said network intrusion event.

4. The method of claim 1 wherein said average frequency is an average frequency of occurrence.

5. A structure comprising:

a memory;

means for converting a non-uniformly sampled discrete network intrusion event time series for a network intrusion event into a uniformly sampled network intrusion event time series, wherein said means for converting comprises:
  specifying a bucket for use in obtaining said uniformly sampled network intrusion event time series;
  detecting said network intrusion event; and
  counting all occurrences of said network intrusion event in said bucket as a single occurrence for said bucket so that said bucket has a state of one of occurrence and no occurrence; and means for determining a frequency characteristic for said network intrusion event based upon said uniformly sampled network intrusion event time series wherein said frequency characteristic is an average frequency of said network intrusion event.

6. A computer-program product comprising a computer-readable medium containing computer program code for a method comprising:

converting a non-uniformly sampled discrete network intrusion event time series for a network intrusion event into a uniformly sampled network intrusion event time series, wherein said converting comprises:
  specifying a bucket for use in obtaining said uniformly sampled network intrusion event time series;

detecting said network intrusion event; and
counting all occurrences of said network intrusion event in said bucket as a single occurrence for said bucket so that said bucket has a state of one of occurrence and no occurrence; and
determining a frequency characteristic for said network intrusion event based upon said uniformly sampled network intrusion event time series wherein said frequency characteristic is an average frequency of said network intrusion event.

7. A system comprising:
a processor; and
a memory coupled to said processor, and having stored therein instructions for a method for characterizing events on a network wherein upon execution of said instructions using said processor, said method comprises:
converting a non-uniformly sampled discrete network intrusion event time series for a network intrusion event into a uniformly sampled network intrusion event time series, wherein said converting comprises:
specifying a bucket for use in obtaining said uniformly sampled network intrusion event time series;
detecting said network intrusion event; and
counting all occurrences of said network intrusion event in said bucket as a single occurrence for said bucket so that said bucket has a state of one of occurrence and no occurrence; and
determining a frequency characteristic for said network intrusion event based upon said uniformly sampled network intrusion event time series wherein said frequency characteristic is an average frequency of said network intrusion event.

8. A structure comprising:
a memory;
a time dependent low-frequency low-amplitude network event reconnaissance detector, wherein said time dependent low-frequency low-amplitude network event reconnaissance detector detects low-frequency low-amplitude network intrusion events on a computer network, said time dependent low-frequency low-amplitude network event reconnaissance detector including:
a low-frequency low-amplitude attenuation function module including a low-frequency low-amplitude attenuation function,
wherein said low-frequency low-amplitude attention function (i) receives occurrences of said network intrusion event as an input signal, and (ii) generates an output signal, wherein multiple occurrences of said network intrusion event within a unit of time are considered as a single occurrence; and
an update detector output with system compensation function module, coupled to said low-frequency low-amplitude attenuation function module, including a system compensation function,
wherein said system compensation function (i) receives said output signal of said low-amplitude attenuation function module, and (ii) generates an anomalous packet indicator output signal that is a time-dependent signal; and
said system compensation function compensates for bursts of activity of said network instruction event separated by periods of time.

9. A method comprising:
processing computer network intrusion events using an attenuation function to generate an indicator of a number of occurrences of a network intrusion event having a particular characteristic, wherein said processing further comprises:
setting said indicator to an initial value on a first occurrence of said network intrusion event;
decreasing said indicator, by said attenuation function, in response to each subsequent occurrence of said network intrusion event following said first occurrence of said network intrusion event; and
identifying said network intrusion event as a low-amplitude low-frequency network event when said indicator has a specified relationship with a threshold at a given point in time.

10. The method of claim 9 wherein said number of occurrences of said network intrusion event is determined by counting all occurrences of said network intrusion event in a time interval as a single occurrence for said time interval.

11. The method of claim 9 wherein said number of occurrences of said network intrusion event is an actual number from an initial time.

12. A computer-program product comprising a computer-readable medium containing computer program code for a method comprising:
processing computer network intrusion events using an attenuation function to generate an indicator of a number of occurrences of a network intrusion event having a particular characteristic, wherein said processing further comprises:
setting said indicator to an initial value on a first occurrence of said network intrusion event;
decreasing said indicator, by said attenuation function, in response to each subsequent occurrence of said network intrusion event following said first occurrence of said network intrusion event; and
identifying said network intrusion event as a low-amplitude low-frequency network event when said indicator has a specified relationship with a threshold at a given point in time.

13. A structure comprising:
a memory;
means for processing computer network intrusion events using an attenuation function to generate an indicator of a number of occurrences of a network intrusion event having a particular characteristic, wherein said means for processing further comprises:
setting said indicator to an initial value on a first occurrence of said network intrusion event;
decreasing said indicator, by said attenuation function, in response to each subsequent occurrence of said network intrusion event following said first occurrence of said network intrusion event; and
means for identifying said network intrusion event as a low-amplitude low-frequency network event when said indicator has a specified relationship with a threshold at a given point in time.

14. A system comprising:
a processor; and
a memory coupled to said processor, and having stored therein instructions for a method for characterizing events on a network wherein upon execution of said instructions using said processor, said method comprises:
processing computer network intrusion events using an attenuation function to generate an indicator of a number of occurrences of a network intrusion event having a particular characteristic, wherein said processing further comprises:

setting said indicator to an initial value on a first occurrence of said network intrusion event;

decreasing said indicator, by said attenuation function, in response to each subsequent occurrence of said network intrusion event following said first occurrence of said network intrusion event; and identifying said network intrusion event as a low-amplitude low-frequency network intrusion event when said indicator has a specified relationship with a threshold at a given point in time.

15. A method comprising:

processing computer network intrusion events using an attenuation function to generate an indicator of a number of occurrences wherein an occurrence is when one or more network intrusion events having a particular characteristic occur in a time interval, wherein said processing further comprises:

setting said indicator to an initial value on a first occurrence of said network intrusion event;

decreasing said indicator, by said attenuation function, in response to each subsequent occurrence of said network intrusion event following said first occurrence of said network intrusion event;

processing said indicator using a system compensation function to generate a time-dependent indicator wherein said system compensation function compensates for bursts of occurrences of said network instruction event separated by periods of time; and identifying said network intrusion event as a low-amplitude low-frequency network event when said time-dependent indicator has a specified relationship with a threshold at a given point in time.

16. A computer-program product comprising a computer-readable medium containing computer program code for a method comprising:

processing computer network intrusion events using an attenuation function to generate an indicator of a number of occurrences wherein an occurrence is when one or more network intrusion events having a particular characteristic occur in a time interval, wherein said processing further comprises:

setting said indicator to an initial value on a first occurrence of said network intrusion event;

decreasing said indicator, by said attenuation function, in response to each subsequent occurrence of said network intrusion event following said first occurrence of said network intrusion event;

processing said indicator using a system compensation function to generate a time-dependent indicator wherein said system compensation function compensates for bursts of occurrences of said network instruction event separated by periods of time; and identifying said network intrusion event as a low-amplitude low-frequency network event when said time-dependent indicator has a specified relationship with a threshold at a given point in time.

17. A structure comprising:

a memory;

means for processing computer network intrusion events using an attenuation function to generate an indicator of a number of occurrences wherein an occurrence is when one or more network intrusion events having a particular characteristic occur in a time interval, wherein said means for processing further comprises:

setting said indicator to an initial value on a first occurrence of said network intrusion event;

decreasing said indicator, by said attenuation function, in response to each subsequent occurrence of said network intrusion event following said first occurrence of said network intrusion event;

means for processing said indicator using a system compensation function to generate a time-dependent indicator wherein said system compensation function compensates for bursts of occurrences of said network instruction event separated by periods of time; and means for identifying said network intrusion event as a low-amplitude low-frequency network event when said time-dependent indicator has a specified relationship with a threshold at a given point in time.

18. A system comprising:

a processor; and a memory coupled to said processor, and having stored therein instructions for a method for characterizing events on a network wherein upon execution of said instructions using said processor, said method comprises:

processing computer network intrusion events using an attenuation function to generate an indicator of a number of occurrences wherein an occurrence is when one or more network intrusion events having a particular characteristic occur in a time interval, wherein said processing further comprises:

setting said indicator to an initial value on a first occurrence of said network intrusion event; and decreasing said indicator, by said attenuation function, in response to each subsequent occurrence of said network intrusion event following said first occurrence of said network intrusion event;

processing said indicator using a system compensation function to generate a time-dependent indicator wherein said system compensation function compensates for bursts of occurrences of said network instruction event separated by periods of time; and identifying said network intrusion event as a low-amplitude low-frequency network event when said time-dependent indicator has a specified relationship with a threshold at a given point in time.

* * * * *

UNITED STATES PATENT AND TRADEMARK OFFICE
CERTIFICATE OF CORRECTION

PATENT NO. : 7,480,940 B1
APPLICATION NO. : 10/866431
DATED : January 20, 2009
INVENTOR(S) : Paul Agbabian and Bruce McCorkendale It is certified that error appears in the above-identified patent and that said Letters Patent is hereby corrected as shown below:

In Column 17, Line 46, Claim 8, replace "attention" with --attenuation--.

Signed and Sealed this

Eighth Day of September, 2009

David J. Kappos
*Director of the United States Patent and Trademark Office*